United States Patent [19]

Calderon

[11] 3,897,029

[45] July 29, 1975

[54] VARIABLE CAMBER MULTI-SLOTTED FLAPS

[76] Inventor: Alberto Alvarez Calderon, Avenida Salaverry 3465, Orrantio del Mar, Lima, Peru

[22] Filed: July 9, 1973

[21] Appl. No.: 377,621

[52] U.S. Cl. .......................... 244/42 CA; 244/42 D
[51] Int. Cl. .............................................. B64c 3/44
[58] Field of Search ......... 244/42 CA, 42 CB, 42 D, 244/42 DB, 42 R

[56] References Cited
UNITED STATES PATENTS

| | | | |
|---|---|---|---|
| 2,938,680 | 5/1960 | Greene et al. .................. | 244/42 CA |
| 3,246,335 | 4/1966 | Alvarez-Calderon .......... | 244/42 CA |
| 3,371,888 | 3/1968 | Alvarez-Calderon .......... | 244/42 DB |
| 3,375,998 | 4/1968 | Alvarez-Calderon .......... | 244/42 CA |
| 3,524,610 | 8/1970 | Alvarez-Calderon ............ | 244/42 R |
| 3,638,886 | 2/1972 | Zimmer ......................... | 244/42 CA |

*Primary Examiner*—Trygve M. Blix
*Assistant Examiner*—Barry L. Kelmachter
*Attorney, Agent, or Firm*—Limbach, Limbach & Sutton

[57] ABSTRACT

An airfoil is specified with a double slotted leading edge flap having two members and adapted to be used together with a multi-slotted trailing edge flap. The leading edge flap uses two slots for landing and one or no slots for take off. The rear leading edge member defines a slot substantially downstream of the cruise leading edge. Ahead of the trailing edge flap slot, there is provided a special slot across the wing's surface in special cooperation with a spoiler. The airfoil surface between the downstream slot of the leading edge flap and the special slot near the trailing edge flap is short and with negligible camber. Special consideration is given to wing torsion, fuel volume, number of slots, and effect of varying airfoil thickness on flap geometric and aerodynamic parameters.

8 Claims, 10 Drawing Figures

PATENTED JUL 29 1975 3,897,029

SHEET 1

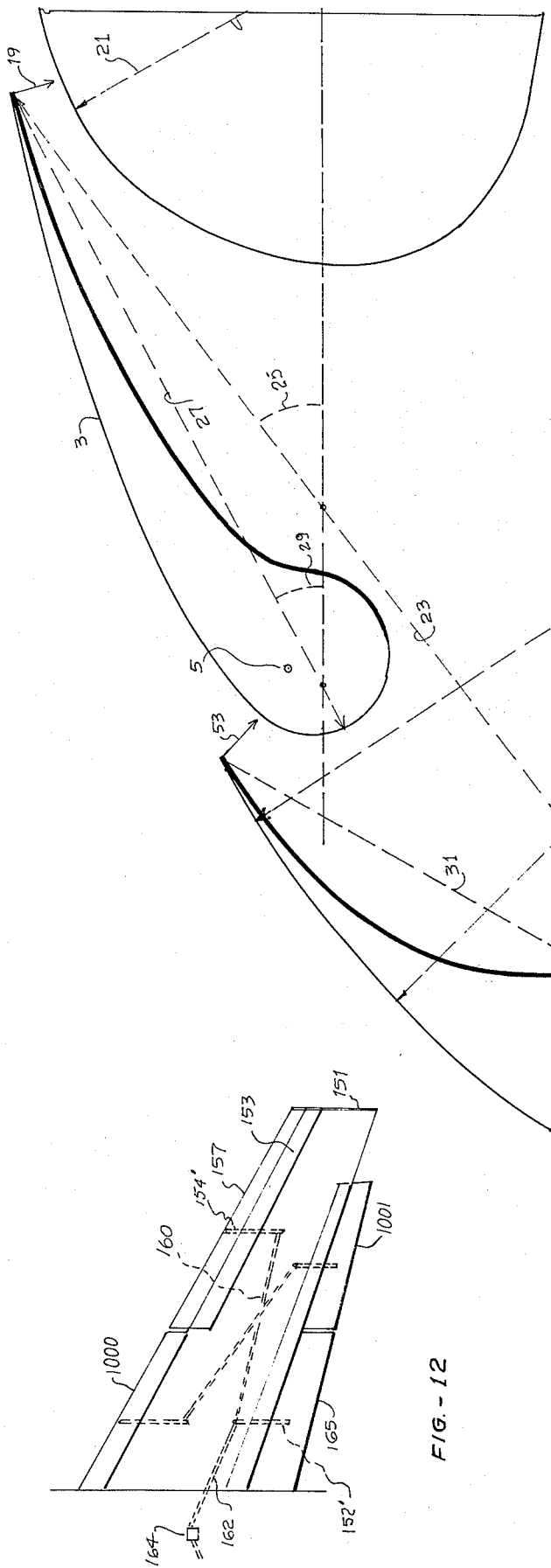
FIG. 2
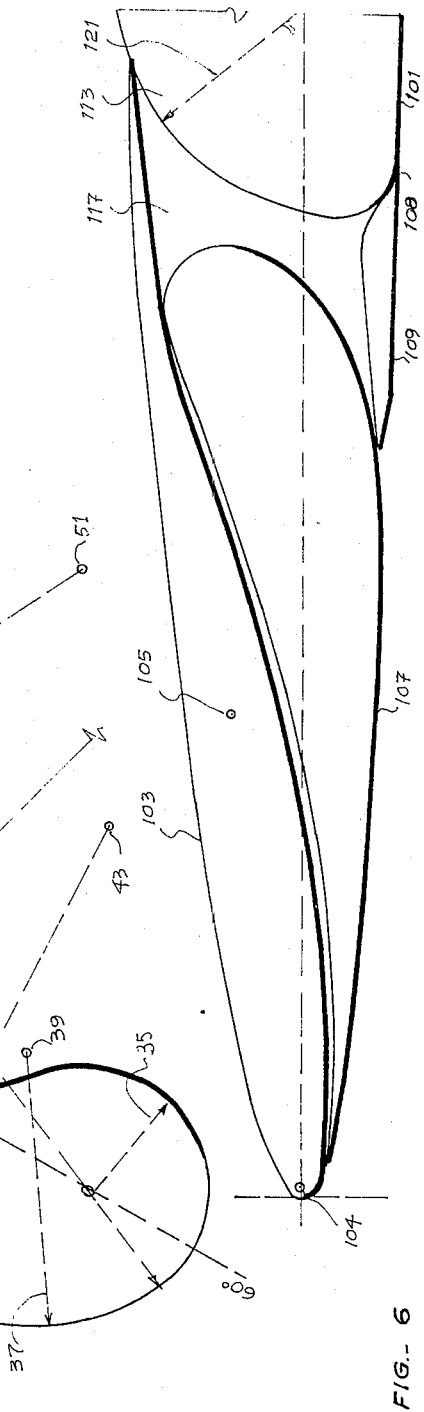
FIG. 6
FIG. 12

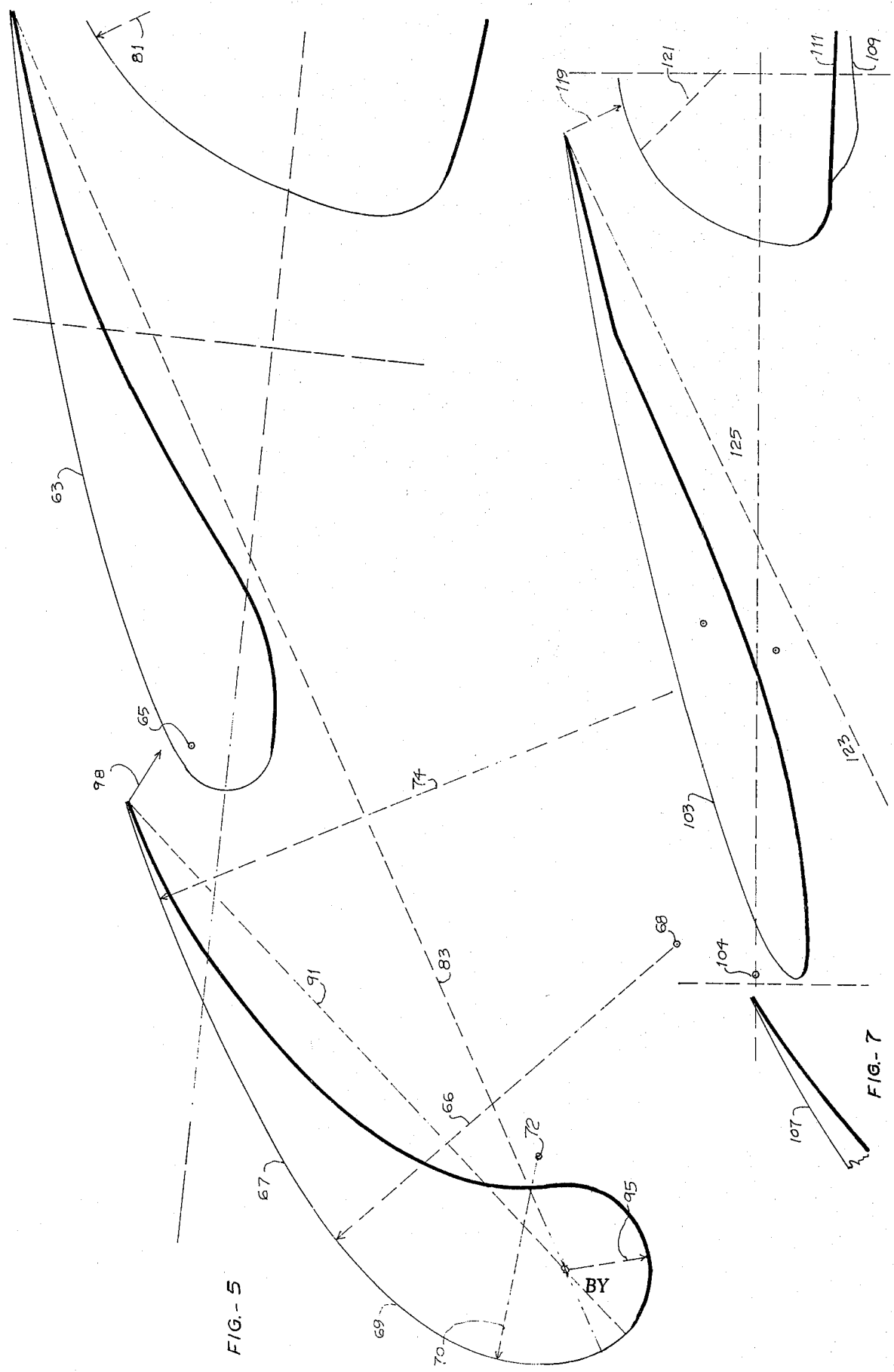

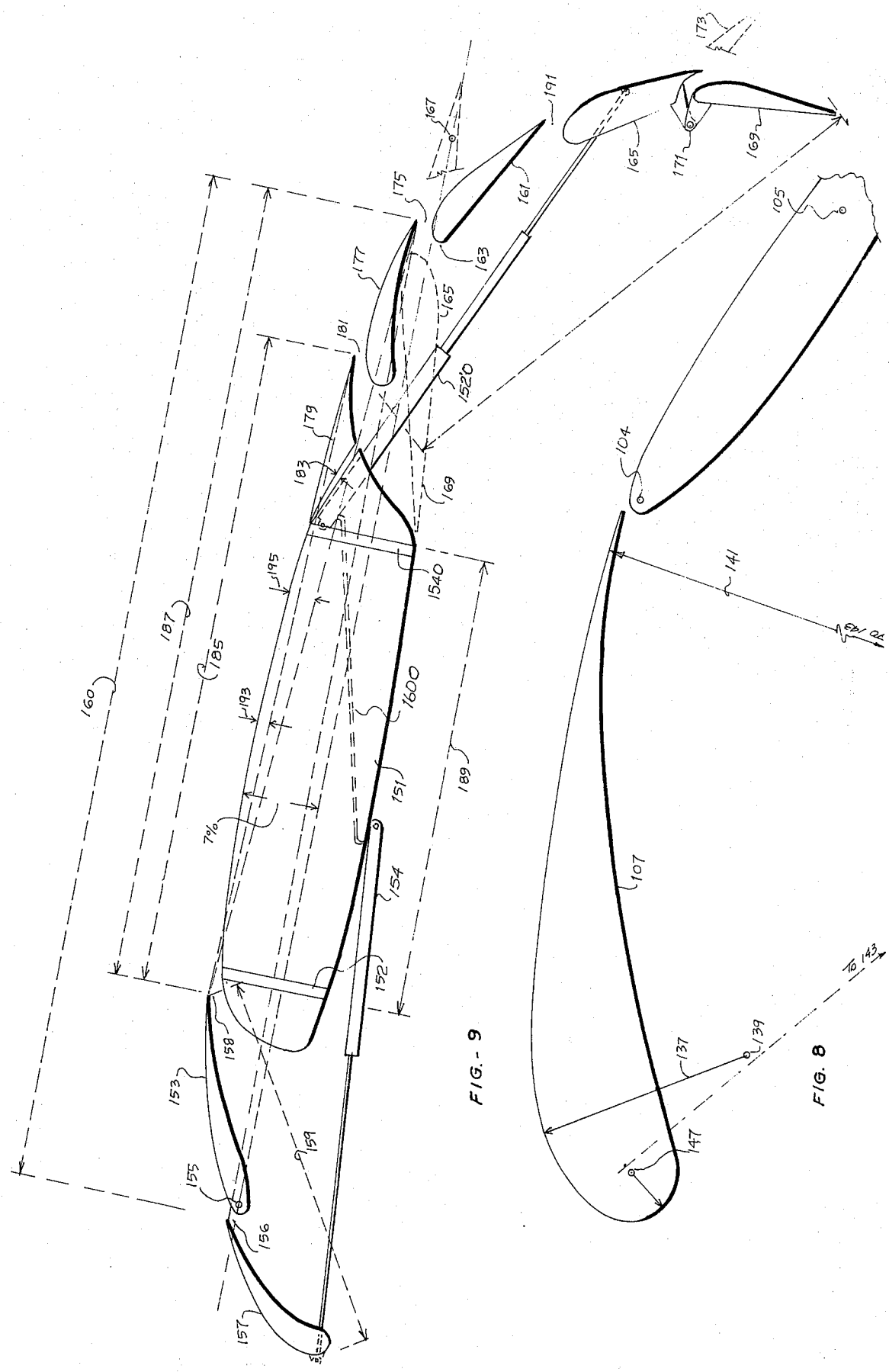

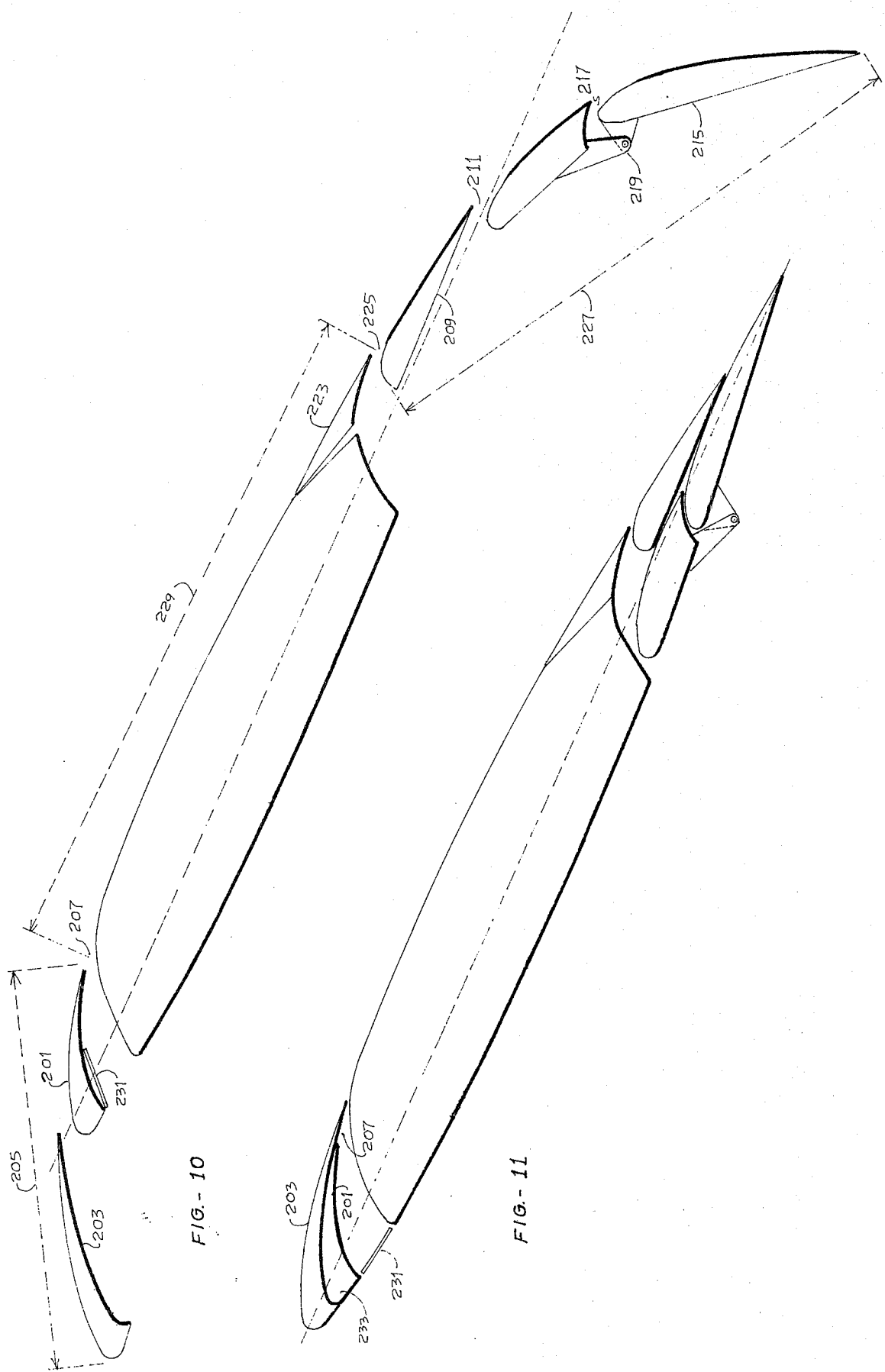

VARIABLE CAMBER MULTI-SLOTTED FLAPS

DESCRIPTION OF PRIOR ART

In my U.S. Pat. Nos. 3,264,335, 3,375,998, 3,481,561 and others, I have reviewed in great extent the aerodynamic, mechanical, and structural problems encountered on the design of various leading edge devices for wings capable of flight at high speeds which are yet required to develop very high lift coefficients in landing and take-off. These will not be reviewed again.

In those patents I have presented single and multi-slotted leading edge flaps, some with variable camber features, and I have taught also basic shapes and proportions which should govern the design of variable camber leading edge flaps having articulated folding in their nose portions.

I have continued my investigations on leading edge shapes taking into account local speed and pressures at very high lift coefficients, including the derivative DP/DS, where P is a local pressure along upper surface S; DV/DS where V is a local speed at point S. I have further considered speed distribution effect on the energy content in the boundary layer along upper surface S, and the relation of this content to the flow turning ability as it relates to curvature distributions as pertinent to take-off and landing, inclusive lift to drag ratio.

Moreover I have examined these problems for various airfoil thickness ratios, and I have come to certain unique specific aerodynamic criteria of shapes and proportions, which are adapted to mate into well known airfoil sections by means of structurally and mechanically simple devices employing some of the teachings of my aforementioned U.S. patents. The teachings of the present patent will become evident in the descriptions contained in the specifications, and in the drawings.

In order to better understand some of the teachings of this present invention, it should be realized in conventional area increasing flaps, such as the Handley page leading edge flap and a full Fowler Flap, slots are provided, located one at the leading and one at the trailing edge of the basic airfoil, respectively. There is attained maximum area increment. However, this full area increment leaves the entire upper surface of the basic airfoil with a full chord length, the flow on top of which is not supported or improved by any high speed slot flows located between its leading and trailing edges. Furthermore the upper surface in its chord length it relatively highly cambered, because it includes the curved leading and trailing edge portions of the basic airfoil or wing. Thus the boundary layer on top of the wing encounters large adverse pressure gradient and very long distances on which it energy content decays, leading to flow separations from the wing's upper surface even if the local surface flows on the leading and trailing edge devices is attached. This adverse phenomena is aggravated with sweep. The solution to these and other problems become evident in the teachings of my present invention, the main purposes of which are specified in the following summary.

SUMMARY OF THE INVENTION

The present invention follows my investigations of the rate of change of speed and pressures along the upper surfaces of the flaps and wings, and considers the effects which these variables have on boundary layer energy content, flow turning ability, and lift to drag ratio contributions of flaps as dependent on chord and shapes of flaps and slots, chord and shape of a wing, and slot location.

In an embodiment of my invention, while I retain the full chord area increment of leading and trailing edge devices, I nevertheless succeed in specifying practical additional flap or spoiler structures which provide special slots located away from and between the leading and trailing edges of the wing, to reenergize the boundary layer on top of the wing such as to improve, and support, attached flows to angles of attack larger than usual. One beneficial effect is the straightening out of the usual decrease of slope of lift curve near maximum lift thereby attaining more lift for a given angle of attack. Another beneficial effect is the extension of the lift curve thus attaining more lift by increasing angle of attack to a larger value than before. A third benefit is the elimination of leading edge type of stall even with swept wings, thereby improving lateral and pitch characteristics near the stall. All this is attained with normal location of front and rear spars of wings, without penalizing or interrupting the torsion box between these spars, and without penalties to fuel volume.

One purpose of my invention is to define a double slotted leading edge flap the downstream slot of which is located as far to the rear as possible on the wing, compatible with maximum chord increment of the flap to the wing and compatible with a practical wing front spar location, in order to minimize the length of flow along the upper surface of the wing which is without the benefits of the flow reenergizing function of a slot.

Another purpose of my invention is to provide, in combination with my double slotted leading edge flap, a trailing edge multi-slotted flap with an upstream slot as close as possible to the downstream slot of my leading edge flaps, but compatible with a maximum chord extension to the wing by the trailing flap, and compatible with a normal or rational rear spar location on the wing.

Another purpose of the invention is to restrict the curvature of a flapped high lift airfoil principally to the developed flapped portions, which have either a very thin boundary layer beginning with at near zero thickness at the stagnation point, or alternatively have a flow reenergizing slot in the close vicinity of the curved regions. Consequently a stringent restriction for curvatures can be placed on the wing's upper surface between the downstream slot of my double slotted leading edge flap and the upstream slot of a trailing edge flap, which, it should be noted, has a greatly decreased chordal length as well due to my special slot locations. of inertia proper of fluid particles.

Another purpose of the invention is to establish the relative size of the first and second flaps of a double slotted leading flap, having in mind the aforesaid considerations.

Another purpose of the invention is to define combinations of double slotted leading edge flaps with multi-slotted trailing edge flaps, inclusive the way to place these in the take-off and landing position, taking into account lift to drag ratio as influenced by local speed distributions on a flapped airfoil and number of slots.

Another purpose of the invention is to eliminate or delay a violet type of leading edge wing stall, forcing a gradual stall, or a stall originating in progressive trailing edge flow separation.

Another purpose of the invention is to eliminate usual lift decay at large angles of attack; therefore improving lift for a given angle of attack, and increasing lift by improving the angle of attack range prior to stall.

Another purpose of the invention is to provide double slotted leading edge flaps on swept wings to improve lift, lateral characteristics, and pitch characteristics.

Another purpose of the invention is to control spanwise lift distribution at large angles of attack for swept and unswept wings by employing leading edge devices having varying number of slots along its span, for example two slots in the outboard regions of a swept wing, and one of no slots in the inboard regions of the wing.

Another purpose of the invention is to define a wing structure having practical spar locations, torsional rigidy and availability of volume for fuel, and yet having, nevertheless, relatively large area increasing flap leading and trailing edge flaps outside the fuel volume and structural regions.

Yet another purpose of the invention is to define combinations of inverting trailing and leading edge flaps which include special cooperation of their actuator pressures and their respective flap loads.

BRIEF DESCRIPTION OF DRAWINGS

The drawings diagramatically illustrate by way of example, and not by way of limitation, forms of the invention wherein reference numerals designate corresponding parts in several views in which:

FIGS. 1 and 2 show, on the nose of a relatively thick airfoil, a sectional view of double slotted leading edge flap in retracted, and in the double slotted landing positions, respectively.

FIGS. 4 and 5 show on the nose of a medium thick airfoil a sectional view of double slotted edge flap in the retracted and in a double slotted high lift positions, respectively.

FIGS. 6 and 7 show on the nose of a thin airfoil a sectional view of my double slotted leading edge flap in retracted and in the double slotted landing positions.

FIG. 8 shows a high lift to drag position of the flap of FIG. 7 with no slots, useful for take-off or climb.

FIG. 9 shows a sectional view of a medium-thick airfoil having a multi-slotted leading and trailing edge flaps, with the airfoil having an upper surface of minimum camber and of minimum chordal length between slots.

FIG. 10 shows a structure alternate to that of FIG. 9, also in the slow speed position, with a multi-slotted trailing edge flap having an open forwardly located slot upstream of the flap knee and reduced camber on the wing's upper surface, with a multi-slotted leading edge flap with a rear ward slot in the open position. FIGS. 11 and 12 show aspects of FIGS. 10 and 9 respectively.

DESCRIPTION OF THE PREFERRED EMBODIMENTS

In this invention I set forth the basic and specific configurations and specific geometric and aerodynamic parameters which result from my investigations.

My invention is not limited in its application to the individual drawings and descriptions, since the invention is capable of other enbodiments and of being practiced in various other ways.

Figure 1:
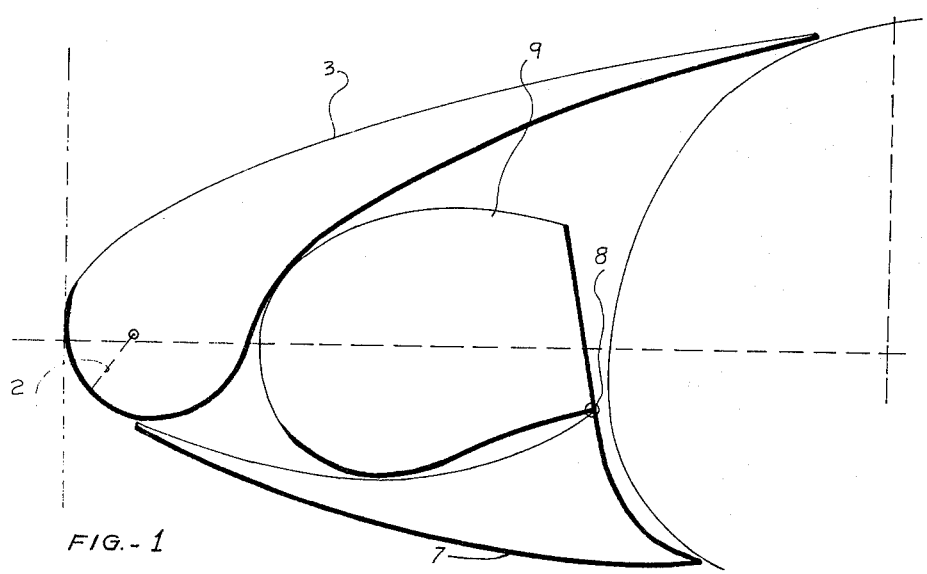

FIG. 1 shows the nose portion 1 of an airfoil on which there is installed retracted my double slotted leading edge flap or auxiliary airfoil. Its upper member 3 is shown hinged at axis 5 forming an upper surface leading portion to the basic or primary airfoil. It should be observed that hinge 5 in this embodiment is actually within a circle defined by the wing leading edge radius 2. Lower flap member 7 is also hinged at 5 in this embodiment, although a different axis could be used. Flap member 7 has a folding nose piece 9 of exceptionally large dimension having a crossectional area larger than that of 7. Nose 9 is folded on top of 7 hinged at 8. Member 7 forms a lower leading surface portion to the basic airfoil. It should also be observed that only small space 17 is left unused within the contours of the airfoil's nose.

FIG. 2 shows the structure of FIG. 1 deployed in a landing configuration. Upper member 3 is raised upwardly about hinge 5 by a small amount to open a downstream slot 19, with the trailing edge of 3 spaced from the front upper surface of 1.

Lower member 7 is shown in FIG. 2 deployed inverted with respect to its retracted position and having an overall chord of approximately 20% of the primary airfoil's chord, which acts to extend the camber and chord of the primary airfoil. Nose 9 is also inverted with respect to member 7, placed unfolded extending the camber and chord of member 7.

Figure 3:
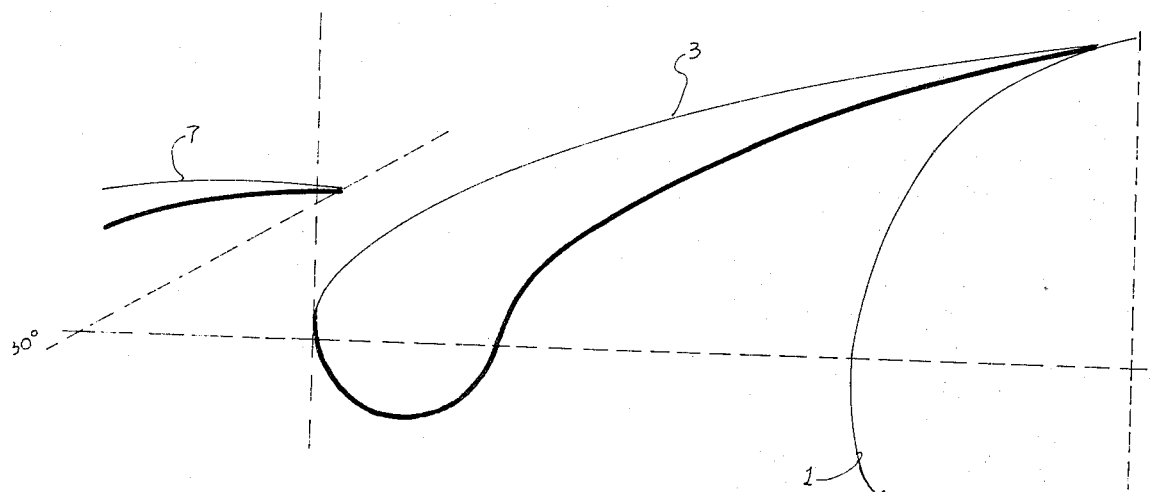
FIG. 3 shows the same airfoil of FIG. 2 in take-off position with one slot, also useful for climb.

FIG. 3 shows a partial view of my double slotted leading edge flap but in a take-off or climb position in which upper member is adapted to be placed at or very near its high speed position, closing slot 19.

Lower member 7–9 is retained extended in a camber increasing chord increasing slotted disposition similar to FIG. 2. In FIG. 3, chord of element 7 inclined at about 30° to the airfoil's basic chord; element 9 is not shown.

There is considerable difference between the aerodynamics of FIGS. 2 and 3.

Firstly, the effective chord of my leading edge device extending between leading edge of 9 and trailing edge of 7 at slot has been halved, as there is less requirement on maximum lift in take-off than in landing. Also, number of slots has been halved.

More important, drag has been decreased because of the closure of slot 19 shown in FIG. 2, which evidently eliminates the high speed airflows into slot 19 which increase drag.

The inverted final shape of drawing 3 below element 3 must not be misunderstood as necessarily increasing drag. This cavity has near stagnant flow conditions, hence there is less friction losses within it than if slot 19 were open.

My design of FIGS. 1, 2 and 3 is shown now with necessary changes to adapt it on a medium thick airfoil in FIGS. 4 and 5, described hereinafter.

Figure 4:
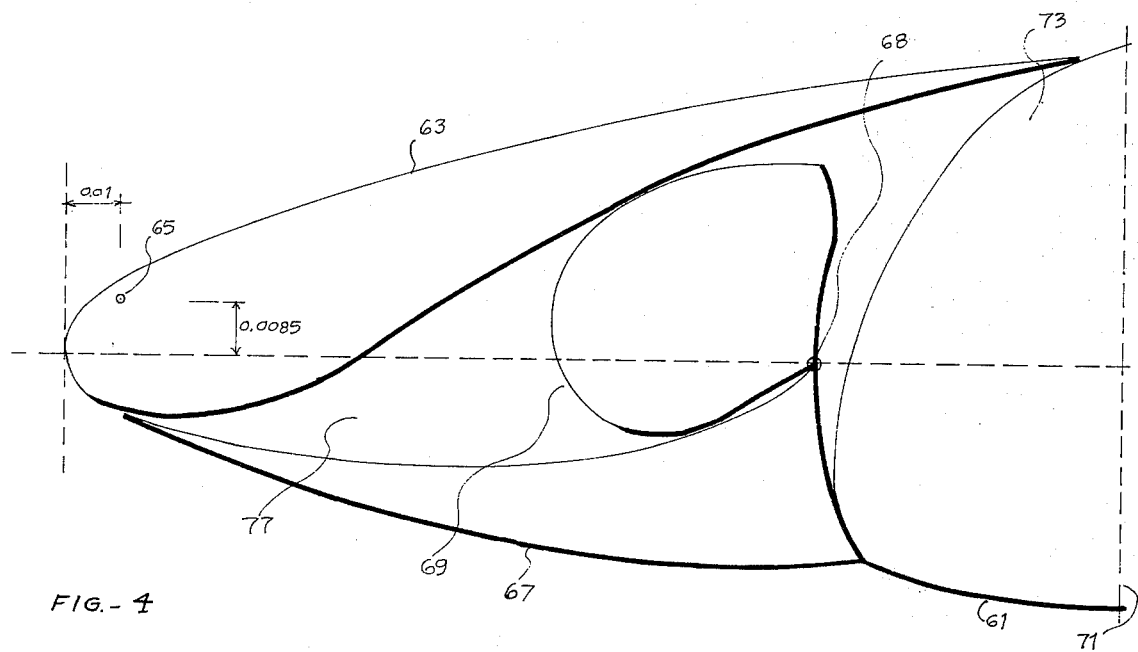

FIG. 4 shows the nose portion 61 of airfoil on which there is installed retracted my double slotted leading edge flap. Its upper member 63 is shown hinged at axis 65 forming an upper surface leading portion to the basic airfoil. It should be observed that hinge 65 in this embodiment is actually within a circle defined by the leading edge circle. Lower flap member 67 is also hinged at 5 in this embodiment, although a different axis could be used. Flap member 67 has a folding nose piece 69 of exceptionally large dimension having a crossectional area about equal to that of 67. Nose 69 is folded on top of 67 hinged at 68. Member 67 forms a lower leading surface portion to the basic airfoil. It should be carefully noted how wing spar 71 is located at approximately 19% of the chord of the primary airfoil, leaving very considerable volume 73 to house actuators and controls. It should also be observed that only small space 77 is left unused within the contours of the airfoil's nose.

FIG. 5 shows the structure of FIG. 4 deployed in a landing configuration. Upper member 63 is raised inwardly about hinge 65 by a small amount to open a downstream slot 79 at approximately 18% chord of the basic airfoil and on its upper surface. Note that the lower slot wall adjacent the slot mouth has a curvature the radius of curvature of which increases in the downstream direction continuously until it blends with the wing's upper surface contour.

My double slotted leading edge flap if FIG. 5 in a take-off position in which upper member is adapted to be placed at or very near its high speed position in an unslotted configuration is not shown but it would be similar to that of FIG. 3, although on certain wing positions, such as near the tips or near nacelles, or at certain high take-off lift coefficients, a double slotted take-off configuration can be used.

My design of FIGS. 1, 2, 3, 4 and 4 is shown now with necessary changes to adapt it on a thin airfoil in FIGS. 6, 7 and 8 described hereinafter.

FIG. 6 shows the nose portion 101 of airfoil on which there is installed retracted my double slotted leading edge flap. Its upper member 103 is shown hinged at axis 105, forming an upper surface leading portion to the basic airfoil. It should be observed that hinge 105 in this embodiment is at about half of the chord of 103 and section does not tend to open trailing edge of 103 away from 101. Leading edge radius of 103 has a dimension of about 0.2% of the chord of the basic airfoil. Lower flap member 107 is hinged at 104 in this embodiment, although a somewhat different axis could be used. Flap member 107 does not have a folding nose piece, but a fixed nose of exceptionally large dimension having a cossectional area much larger than that of 103. As a fairing for high cruise, there is provided a folding door 109 hinged at 108. Member 107 forms a lower leading surface portion to the basic airfoil.

FIG. 7 shows the structure of FIG. 6 deployed in a landing configuration. Upper member 103 is raised upwardly about hinge 105 by a small amount to open a downstream slot 119. Note that the lower slot wall adjacent the slot mouth has a curvature the radius of curvature of which increases in the downstream direction continuously until it blends with the wing's upper surface contour.

Lower member 107 is shown deployed inverted with respect to its retracted position, extending the camber and chord of basic airfoil. Folding piece 109 is inverted with respect to member 101 placed unfolded rearwardly.

Note how from within the region included from high speed leading edge of primary airfoil, and its spar location at 20% of its chord, my double slotted leading edge device unfolds with a practical structure, to define an overall rectilinear chord of the auxiliary airfoil of 34% of the primary airfoil's chord, that is about twice as much as the distance from the leading edge flap of the basic airfoil to its front spar location, or to the front end of the wing's torsion box.

FIG. 8 shows my double leading edge flap in a take-off position in which upper member is adapted to be placed at or very near its high speed portion closing slot 119, as well as front slot shown in FIG. 7 between 107 and 103. Lower member 107 is retained extended in FIG. 8 in a camber increasing chord increasing slotted disposition similar to FIG. 7.

There is considerable difference between the aerodynamics of FIGS. 7 and 8.

Firstly, the effective chord of my leading edge device has been halved, as there is less requirement on maximum lift in take-off than in landing. Also, all slots have been eliminated, such that drag be decreased, because of the closure of slots evidently eliminates the high speed airflows into the slots, which increase skin drag.

My designs of prior figures are shown now on a medium thick airfoil of about 12% thickness in FIG. 9, incorporating also a trailing edge multi-slotted flap of the inverting kind.

FIG. 9 shows a primary airfoil 151 having a fuel volume and wing torsion box between a front spar 152 and a rear spar 1540.

The primary airfoil or wing, has my double slotted leading edge flap with an upper member 153 hinged at 155, and a lower member 157 which increases the chord and camber of 153 and 151.

Two slots are formed by my leading edge device; upstream slot 156 and downstream slot 158, both of which are shown open in the landing disposition.

The aerodynamic chord of my double slotted device is 189, about 32% of the high speed chord 160.

At the trailing edge of 151, I show a special multi-slotted flap arrangement combined with wing and spoiler.

The flap itself comprises vane 161 pivoted at 163 and an inverting member 165 pivoted at 167.

Flap 165 shows a novel and advantageous use of a slotted articulation formed between the thick and thin ends of the inverting member. The thin end is noted at 169. The slot could be a fixed slot approximately as shown in the retracted position. However, 169 is shown articulated at 171 in the landing position. Position 173 can be used to decrease wing lift for change of flight pail, or to decrease drag during flap retraction. Finally, element 169 could be made telescopic into 165 in order to increase chord of 165 for high lift and decrease flap drag in the retraction cycle.

With respect to the wing itself, a novel and peculiar arrangement of special cooperation is shown in which a spoiler 179 is mounted ahead of the usual wing-flap slot 175. It should be understood that element 177 is fixed a part of the wing, and that ahead of it, another and unique slot 181, ahead of a conventional flap slot, is formed by raising spoiler slightly by angle 183, by which method slot 181 is located upstream of 175, as close as possible to slot 185. Slot 181 improves flow before it gets to slot 175, thereby permitting larger flap deflection. Also, curvature between 158 and 181 is effectively decreased.

These advantages are better understood as follows:

The distance 185 between 158 and 181 is only about 57% of the chord 160, which is considerably shorter than usual distance 187 to slot 175, which is about 70% chord.

Moreover, by raising 179, effective upper surface camber 193 between slots 158 and 181 is only about 1.2% of chord 160; whereas effective upper surface camber 195 between front slot 158 and usual slot 175 is about twice as much.

Smaller camber and shorter chord between my slots delay and impede flow separation on the wing's upper surface.

Moreover, the combined effects of my double slotted leading edge flap, in particular the rearward location of its downstream slot; and my trailing edge flap design, in particular the forward location of its upstream slot, can be more readily appreciated and understood with the following considerations:

Distance 189 between front and rear members of wing is 40% of chord 160 with continuous torsion box between.

Leading edge effective chord 159 is 33% of chord 160.

Trailing edge effective chord 191 is 45% of chord 160.

Distance 187 between slots 158 and 175 is 70% of chord 160.

Approximate arched length of airfoil all flaps deployed is 33 + 70 + 45 = 148% of chord 160.

Most important, length of upper surface between slots 158 and 181, which no slots in between and virtually no chamber, is only 57% of chord 160, that is only about 39% of the total arched length which is 148% of chord 160.

Hence the cambered portions are the remaining highly curved surfaces all of which are either reenergized by local slots, and/or have very thin boundary layers, and/or have specially prescribed surface curvatures and gradients.

In fact, in my design of FIG. 9, slots are so distributed that elements 157, 153, 177, 161, 165 and 169 are all of small chords of the order of 20% of chord of basic airfoil 160, and are favorably benefited by slots 155, 158, 181, 175 and 191.

Yet this design does not use sliding surfaces, does not need large protruding brackets, and is extremely simple from the mechanical and structural view point.

Finally in FIG. 9 I show actuator 154 for inverting leading flap member 157, and actuator 1520 for inverting trailing edge flap member 165.

Air pressure tends to open 165 when extending it.
Air pressure tends to close 157 when extending it.

Therefore air pressure provides energy into actuator 1520 which is transformed into an increment of pressure passed on to actuator 154 by means of connecting line 1600.

Therefore, a substantial portion of the pressure energy required to open 157 is provided by work done by air on moving flap 165, and work done by 165 on 1520. This provides for a smaller lighter actuator, and permits an emergency device to open 157.

FIGS. 10 and 11

Similar advantages to those mentioned with respect to FIG. 9 are shown in FIG. 10 in alternate enbodiments.

A double slotted leading edge flap showing in the extended position a fixed downstream member 201 and a sliding lower member 203 is shown having an effective chord 205 of about 34% of cruise chord. Rear slot 207 is about 17% downstream of cruise leading edge.

At the trailing edge there is shown a peculiar combination of sliding and pivoted flaps. Sliding member is 209 which moves on track rearwardly by about 28% of cruise chord to a slot forming position inclined at about 30° for take-off and landing. Slot 211 is formed between 209 and fixed wing position 213.

Flap member 215 is shown inclined by about 60° for landing position forming a downstream slot 217 with respect to 209 by pivotal motion about 219 with simple small brackets. For take-off 215 is placed in position 221 whereby slot 217 is closed to decrease take-off drag.

A spoiler 223 is provided which when raised by a small angle defines upstream trail slot 225 of the kind described in reference to FIG. 9, located well forward, about 26% of cruise chord, from cruise trailing edge.

Effective trailing flap chord between slot 225 and 215 is about 55% of cruise chord and shown as 227.

Upper wing surface between slots 207 and 225 has a chord 229 of about 58% of cruise chord, which is aerodynamically small as intended, and with virtually no camber, as also intended.

FIG. 11 shows the structure of FIG. 10 in cruise configuration with a simple, neat, and peculiar storage of my trailing elements. At the leading edge, special cooperation is shown in that 203 retracted covers slot 207. A lower door is shown closing intake mouth of slot. Element 201 could be pivoted at 233 if desired to avoid large chord of 203, in which case 201 would work in a way similar to 153 of FIG. 9.

FIG. 12 shows in planform aspects of FIG. 9, inclusive an inboard inverting trailing flap member 165 connected to an outboard flap member by means of line 160.

Also shown in the figure is the use of part span upper leading edge flap member 153 to prevent outboard stall on the swept wing 151, on which portion my double slotted leading edge flap is specially beneficial, as it controls the deterioration effects of spanwise flows within the boundary layer because of the rearward location of the downstream slot of the leading edge flap and the unique oposition provided by the reinforced boundary layer on both leading edge flap members against spanwise flows.

FIG. 12 also shows how the outboard inverting trailing flap member 1001, which is swept and similar to inboard swept trailing edge flap member 165, is connected to the inboard inverting leading edge flap member 1000, which is also swept and similar to outboard swept leading edge member 157.

Important advantages of the swept double slotted leading edge flap members 157 and 153 on the outboard region of swept wing 151 is the control of spanwise maximum lift distribution by varying the number of slots from one slot in the inboard swept leading edge region between member 1000 and wing 151, to two slots in the outboard leading edge region, as is shown in cross sectional view in FIG. 9, and as has been mentioned already in the specifications as purpose of the invention. Another important purpose also mentioned earlier, is that the maximum angle of attack range of the wing having the double slotted leading edge flap is greater than the inboard portion, improving lateral control by preventing wing tip stall, and opposing pitch up characteristics normally associated with wing tip stall of swept wings, by opposing wing tip stall. Yet, the inward swept wing region can contribute strongly to high lift with the aid of its slotted leading edge flap member 1000. Finally, in FIG. 12 there is shown connection 160 to equalize and interconnect hydraulic energy imparted on 160 by inverting trailing edge flap 165 while opening.

I claim:

1. A variable geometry leading edge flap for a wing capable of modulated airflows to establish two slow speed aerodynamic regimes having different drag and lift characteristics and different angles of attack for maximum lift attained by varying the number of slots and the efficiency of the flap's chord comprising a. an upper flap member which in a cruise disposition defines a leading edge and a forward upper surface portion of the wing's contour, b. a lower flap member at least a portion of which in a cruise disposition contributes to define a forward lower surface portion of the wing's contour, c. said leading edge flap having a landing disposition in which two slots are operative with aerodynamic flows being modulated with said lower flap member inverted from said cruise disposition downwardly and forwardly to a position increasing the camber and chord of said wing ahead of said wing and ahead of said upper member, with the trailing edge of said lower member being spaced from the leading edge of said upper member to define converging walls of a first upstream slot therebetween; and with the trailing edge of said upper member being spaced in said landing disposition from said wing's upper surface to define the walls of a second slot downstream of said first slot, and with said lower flap member inclined at a steep angle and modulating the flow on top of said upper member with the aid of flow through said first upstream slot, and modulating the flow on top of said wing by the combined beneficial effects of both said first upstream slot and said second slot, d. with said leading edge flap being further characterized in that at least one of said upper flap member and said lower flap member is hinged so as to close one of said slots, defining a slow speed climb disposition of lower drag than said landing disposition with only one slot operative, in which the gap of one of said first and second slots extending over a portion of said wing is adapted to be reduced substantially towards a closed position with the other remaining slot constituting the aerodynamically effective slot.

2. The structure of claim 1 further characterized in that said leading edge flap in said slow speed climb disposition has its lower member inverted from said cruise disposition downwardly and forwardly to a position increasing the camber and chord of said wing with said lower member having its trailing edge spaced from the leading edge portion of said upper member to define the walls of said first upstream slot, said first upstream slot being the principal operating slot, and with said upper member placed in a position substantially conforming to the leading edge contour of said wing; with said leading edge flap structure being further characterized in that its aerodynamically effective chord which extends between the leading edge of said lower member and said principal operating slot is of the order of one half of the aerodynamically effective chord of said leading edge flap in said landing disposition wherein said chord extends between said leading edge of said lower member and said second slot.

3. The structure of claim 1 further characterized in that said leading edge flap in said slow speed climb disposition has aerodynamic flows modulated with said lower member inverted from said cruise disposition, downwardly and forwardly to a position increasing the camber and chord of said wing and of said upper flap member, with the trailing edge of said lower member being immediately adjacent to the leading edge of said upper member and with the trailing edge of said upper member being spaced from said wing's upper surface to define therebetween the walls of said only one operative slot.

4. The structure of claim 1 further characterized in that said leading edge flap in said slow speed climb disposition has aerodynamic flows modulated with said lower member inverted from said cruise disposition, downwardly and forwardly to a position increasing the camber and chord of said wing, with the trailing edge of said lower member being immediately adjacent to the upstream edge of said upper member, and with the trailing edge of said upper member being substantially contiguous to an upper surface of said wing thereby rendering aerodynamically inoperative and mechanically closed said first and second slots.

5. A variable geometry leading edge flap for a wing capable of modulated airflows to establish two slow speed aerodynamic regimes having different drag and lift characteristics and different angles of attack for maximum lift attained by varying along at least a portion of the span of said wing the number of slots and the efficiency of the flap's chord comprising a. an upper flap member which in a cruise disposition defines a leading edge and a forward upper surface portion of the wing's contour, b. a lower flap member at least a portion of which in a cruise disposition contributes to define a forward lower surface portion of the wing's contour, c. said leading edge flap having a high lift disposition in which a first portion of its span has two slots operative with aerodynamic flows being modulated with said lower flap member inverted from said cruise disposition downwardly and forwardly to a position increasing the camber and chord of said wing ahead of said wing and ahead of said upper member, with the trailing edge of said lower member being spaced from the leading edge of said upper member to define converging walls of a first upstream slot therebetween; and with the trailing edge of said upper member being spaced in said high lift disposition from said wing's upper surface to define the walls of a second slot downstream of said first slot, and within said lower flap member inclined at a steep angle and modulating the flow on top of said upper member with the aid of flow through said front slot, and modulating the flow on top of said wing by the combined beneficial effects of both said first upstream slot and said second slot, d. with said leading edge flap in said high lift disposition being further characterized in having a second portion of its span with only one operating flap member.

6. The structure of claim 5 characterized further in that said only one operating flap member contributes to define walls of one operating slot between the trailing edge of an upper flap member and a surface portion of said wing.

7. The structure of claim 5 further characterized in that said only one operating flap member contributes to define walls of one operating slot between the trailing edge of a lower flap member and a surface portion of said wing.

8. A variable geometry leading edge flap for a swept wing capable of modulated airflows to establish two slow speed aerodynamic regimes having different drag and lift characteristics and different angles of attack for maximum lift, attained by varying the number of slots and the efficiency of the flap's chord comprising
   a. a swept upper flap member which in a cruise disposition defines a leading edge and a forward upper surface portion of the wing's contour,
   b. a swept lower flap member at least a portion of which in a cruise disposition contributes to define a forward lower surface portion of the wing's contour,
   c. said swept leading edge flap having a high lift disposition in which adjacent its outboard region airflows are modulated to sustain a first large maximum angle of attack with two flap members aerodynamically operative and two slots modulating said airflow, with said lower flap member inverted from said cruise disposition downwardly and forwardly to a position increasing the camber and chord of said wing ahead of said wing and ahead of said upper member, with the trailing edge of said lower member being spaced from the leading edge of said upper member to define converging walls of a first upstream slot therebetween; and with the trailing edge of said upper member being spaced in high lift disposition from said wing's upper surface to define the walls of a second slot downstream of said first slot, and with said lower flap member inclined at a steep angle and modulating the flow on top of said upper member with the aid of flow through said front slot, and modulating the flow on top of said wing by the combined beneficial effects of both said first upstream slot and said second slot, said combined beneficial effects tending to oppose the generation of spanwise flows on said outboard regions.
   d. with said swept leading edge flap being further characterized in having in said high lift disposition, an inboard region in which airflows are modulated to sustain a second maximum angle of attack smaller than said first maximum angle of attack on said outboard region with only one of said flap members operating in said inboard region.

* * * * *